May 30, 1967  O. K. SCHWENZFEIER  3,322,260
BALANCED VIBRATORY PARTS FEEDER
Filed Feb. 7, 1966 2 Sheets-Sheet 1

INVENTOR.
OTTO K. SCHWENZFEIER
BY Knox & Knox

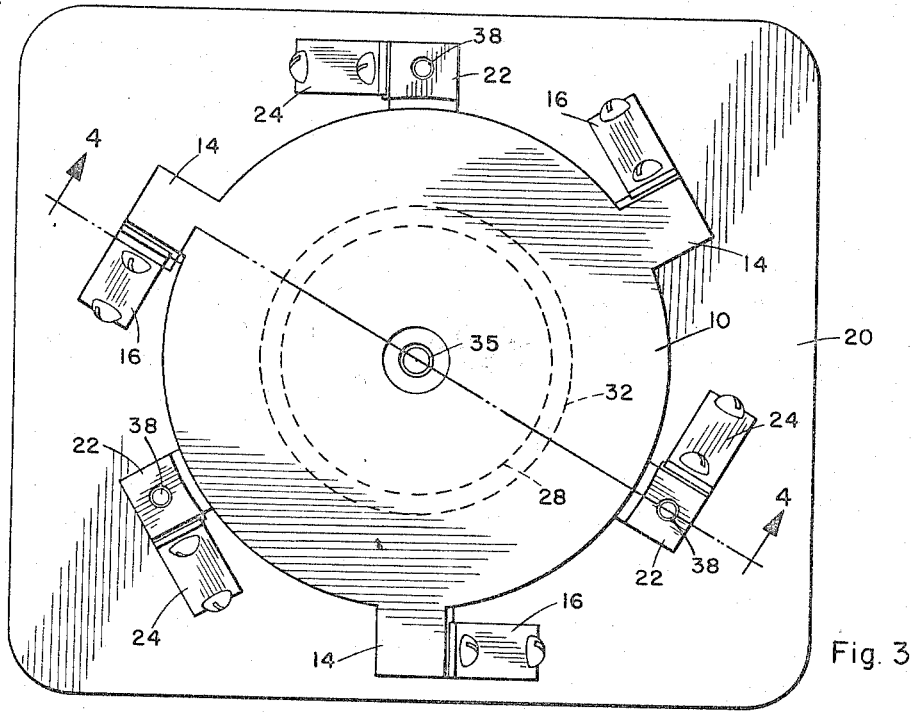
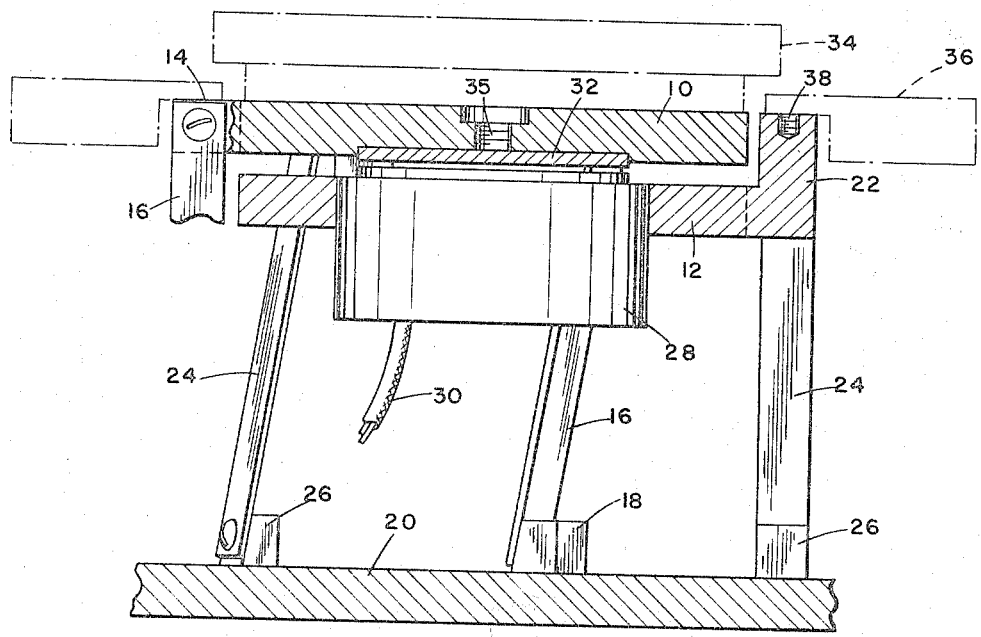

United States Patent Office 3,322,260
Patented May 30, 1967

3,322,260
BALANCED VIBRATORY PARTS FEEDER
Otto K. Schwenzfeier, 171 K St.,
Chula Vista, Calif. 92011
Filed Feb. 7, 1966, Ser. No. 525,648
8 Claims. (Cl. 198—220)

The present invention relates to material handling and specifically to a balanced vibratory parts feeder.

In many sorting, packaging, or assembly operations it is necessary to deliver a supply of parts or items in an orderly array. A number of devices are available for this purpose, including vibratory feeders which advance parts along a track by vibrating the track in the required direction of motion. Usually the vibration is provided by an alternating field electromagnet driving an armature on which the track structure is mounted. The armature is mounted on resilient supports and the electromagnet is attached to a fixed base. A major problem with such devices is vibration in the base caused by oscillation of the electromagnet by reaction equal and opposite to that of the armature. This can be minimized by a very massive base, which makes the unit difficult to handle and increases the cost, or by mounting the entire unit on some type of absorbent cushion. The latter arrangement makes it difficult to maintain accurate alignment of the parts guiding track in a complete conveying and distribution system.

The primary object of this invention, therefore, is to provide a vibratory parts feeder in which the vibration is balanced and virtually isolated from the base or mounting, eliminating the need for a cushion or resilient feet.

Another object of this invention is to provide a vibratory parts feeder which is adaptable to rotary or linear motion and will accept available types of bowls, channels and other track arrangements.

Another object of this invention is to provide a vibratory parts feeder which is, if necessary, capable of feeding two sets of parts simultaneously.

A further object of this invention is to provide a vibratory parts feeder which is very simple in structure and is adaptable to a wide range of sizes and operating conditions.

The vibratory feeder and its action are illustrated in the drawings, in which:

FIGURE 3 is a top plan view of the feeder of FIGURE 1; and

FIGURE 4 is a sectional view taken on line 4—4 of FIGURE 3.

Similar characters of reference indicate similar or identical elements and portions throughout the specification and throughout the views of the drawing.

Figure 1:
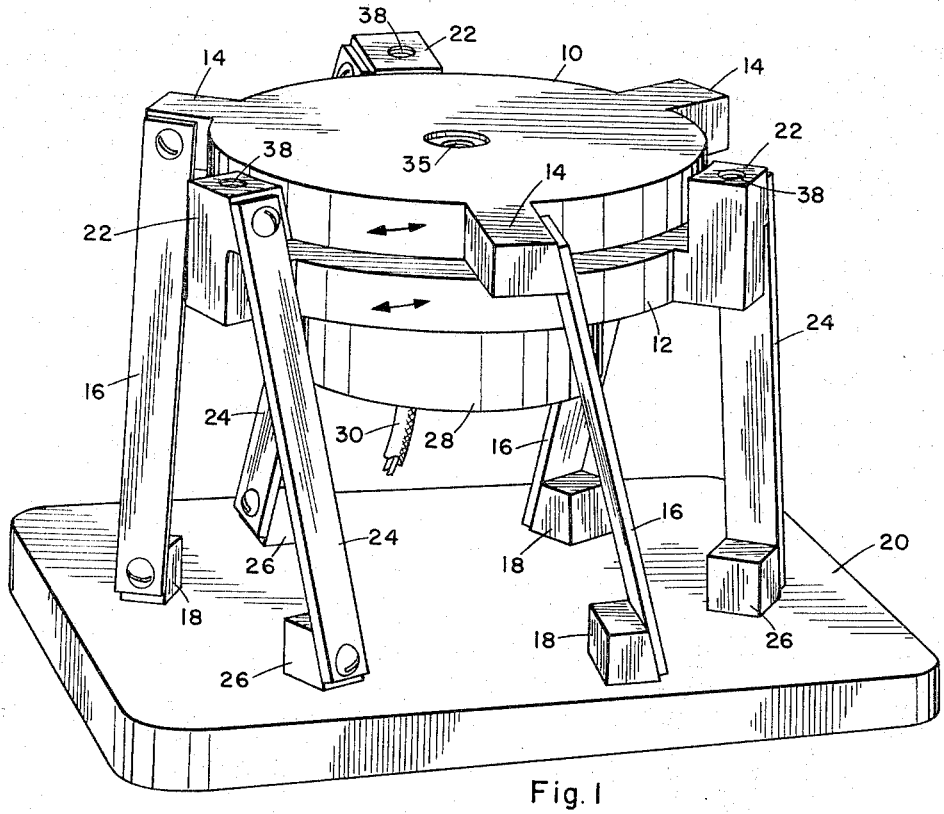
FIGURE 1 is a perspective view of the rotary form of the feeder.

Referring now to the rotary unit of FIGURES 1, 3 and 4, the vibratory structure comprises an upper vibrating head 10 and a lower driving head 12 in closely spaced parallel relation, the heads being illustrated as similar discoid plates, although other shapes may be employed. Vibrating head 10 has a plurality of radially extending fingers 14, three being indicated as an example, equally spaced around the periphery. The vibrating head 10 is supported on a set of resilient legs 16 each secured at its upper end to one of the fingers 14 and at its lower end to a foot 18 on a base 20. Legs 16 are shown as flat spring elements with the flat faces thereof substantially radial to the vertical axis of the vibrating head 10, the legs being inclined to the vertical in a common direction circumferentially around the head.

Driving head 12 has radially extending fingers 22 spaced between fingers 14 and is supported on a second set of resilient legs 24 secured between fingers 22 and feet 26 located on the base 20 between feet 18. Legs 24 are also inclined to the vertical and are parallel to legs 16. To ensure equal motion of the heads and corresponding spring rate the legs 16 and 24 are preferably of equal length, which may be arranged by extending fingers 22 upwardly alongside the edge of head 10. For certain purposes, however, the lengths of the two sets of legs may be different, so that one head has a greater motion than the other.

Other spring arrangements may be used, but at least three are required on each head to ensure coplanar alignment of the heads at all times.

Mounted in the driving head 12 is a driving unit 28, illustrated as an electromagnet with a power supply cable 30, and in the vibrating head 10 is a magnetically permeable armature, or vibrating unit 32 closely spaced from the electromagnet.

When the electromagnetic driving unit 28 is energized the armature 32 is attracted and the heads 10 and 12 pulled together. Due to the inclined resilient leg supports the vibrating head 10 will be pulled down and rotated in one direction, while the driving head 12 is pulled up and rotated in the opposite direction. When the driving unit 28 is de-energized the resilient legs return the heads to their original positions, or slightly beyond due to inertia. If the action is repeated rapidly, as by an alternating current applied to the driving unit, the two heads will vibrate equally and oppositely at the frequency of the current. Since the motions of the two heads are equal and opposite and coupled to the base only through the resilient legs the vibration is very effectively balanced or damped out. For maximum damping of vibration the heads can be designed to be of equal mass and have equal dynamic moments.

Many different types of parts containers may be mounted on the vibrating head 10, the usual type being a shallow bowl, as indicated at 34 in FIGURE 4. This type of bowl usually has an internal spiral ramp up which the parts are made to climb by the vibratory action, to be ejected in orderly succession from a peripheral outlet. During the rising motion of the bowl while vibrating, the parts are frictionally held on the track by gravity and are carried in the direction of rotation. When the bowl descends during the return motion the track effectively drops away from the parts and reduces friction to the extent that the parts tend to remain in position while the track rotates beneath. The actual motion is small, but the rapid rate of repetition causes the parts to move up the ramp. Bowl 34 can be secured by a suitable screw to a threaded socket 35, or similar attachment means in head 10.

An additional bowl 36 of annular configuration can be attached to fingers 22, such as to threaded sockets 38, to move with the driving head 12, so that a different set of parts are driven in the same direction as those in bowl 34. This arrangement utilizes fully the balanced action of the unit and doubles the capacity for handling parts.

Figure 2:
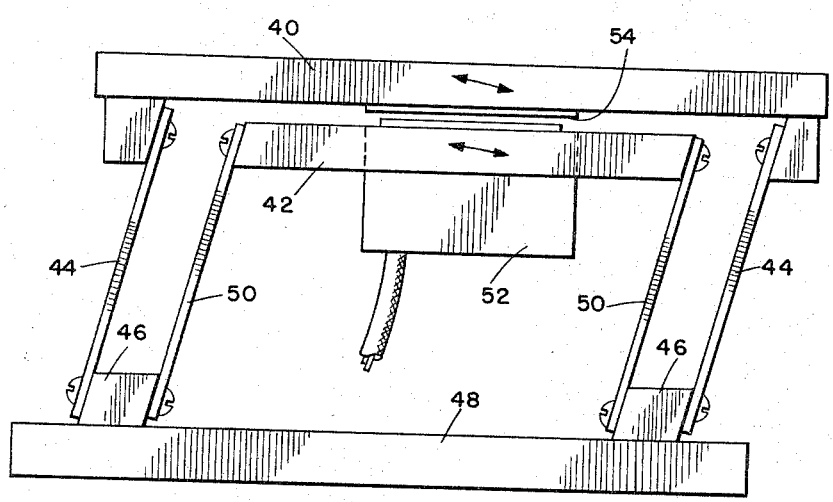
FIGURE 2 is a side elevation view of a linear motion unit.

The balanced action is also adaptable to a linear feeder, as in FIGURE 2. The vibrating head 40 and driving head 42 are both of simple rectangular block or plate form and elongated to any extent necessary, the driving head being somewhat shorter than the vibrating head. From opposite ends of vibrating head 40 a pair of resilient legs 44 extend downwardly to feet 46 on a base 48. A similar pair of legs 50 extend from the opposite ends of driving head 42 to the feet 46, all four legs being parallel and inclined to the vertical. By spacing legs 50 inside the legs 44, the common feet 46 serve to hold the paired legs and simplify construction. An electromagnetic driving unit 52 is mounted on driving head 42 and an armature vibrating unit 54 on the vibrating head 40.

When an alternating current is applied to driving unit 52 the heads 40 and 42 oscillate linearly and vertically, as indicated by the directional arrows, but in opposite directions so that the vibration is damped out at the base. Various types of linear tracks can be mounted on top of or at the sides of the head 40 and on one or both sides of head 42.

With little or no vibration to contend with at the base, the structure can be lightly built, commensurate with the size of the track elements and the parts to be handled. Mountings are simplified and the unit is readily incorporated into a wide range of material handling installations.

It is understood that minor variation from the form of the invention disclosed herein may be made without departure from the spirit and scope of the invention, and that the specification and drawing are to be considered as merely illustrative rather than limiting.

I claim:
1. A balanced vibratory parts feeder comprising:
   a base;
   a vibrating head and a driving head adjacent thereto at least one of said heads having a parts carrying element connected thereto to move therewith;
   resilient mounting means connecting both of said heads to said base for limited movement relative thereto and relative to each other;
   said driving head having an electromagnetic driving unit thereon and thus spaced from said base by the resilient mounting means of the driving head, said driving head having magnetic coupling to said vibrating head;
   and means to pulsate said driving unit oscillating said heads in 180 degrees out of phase relationship, said resilient mounting means accommodating such opposite oscillation so that the vibrations are not transmitted to said base.

2. A parts feeder according to claim 1, wherein said heads are slightly spaced apart vertically and wherein said resilient mounting means includes a first set of resilient legs extending upwardly from said base and supporting said vibrating head, and a second set of resilient legs extending upwardly from said base and supporting said driving head.

3. A parts feeder according to claim 2, wherein all of said legs are inclined to the vertical in a common direction.

4. A parts feeder according to claim 2, wherein said vibrating and driving heads are substantially discoid and said legs are circumferentially spaced thereon, said legs all being inclined to the vertical axis of said heads in a common direction circumferentially thereof.

5. A parts feeder according to claim 4, wherein said first and second sets of legs are of substantially the same length.

6. A parts feeder according to claim 4, wherein said legs are all strap leaf spring elements having flat faces substantially radial to the vertical axis of said heads.

7. A parts feeder according to claim 2, wherein said vibrating and driving heads are elongated, said legs being attached to opposite ends of the respective heads.

8. A parts feeder according to claim 7, wherein said driving head is immediately below said vibrating head, said second set of legs being spaced inside said first set of legs, all of said legs being inclined to the vertical in a common direction.

References Cited
FOREIGN PATENTS

| 1,110,623 | 2/1956 | France. |
| 776,699 | 6/1957 | Great Britain. |
| 806,441 | 12/1958 | Great Britain. |

EVON C. BLUNK, *Primary Examiner.*

EDWARD A. SROKA, *Examiner.*